(No Model.)

9 Sheets—Sheet 1.

F. A. JONES.
ENVELOPE MACHINE.

No. 467,977. Patented Feb. 2, 1892.

Witnesses:
John Becker
Charles E. Johnson.

Inventor:
Frank A. Jones
by James Law
Attorney.

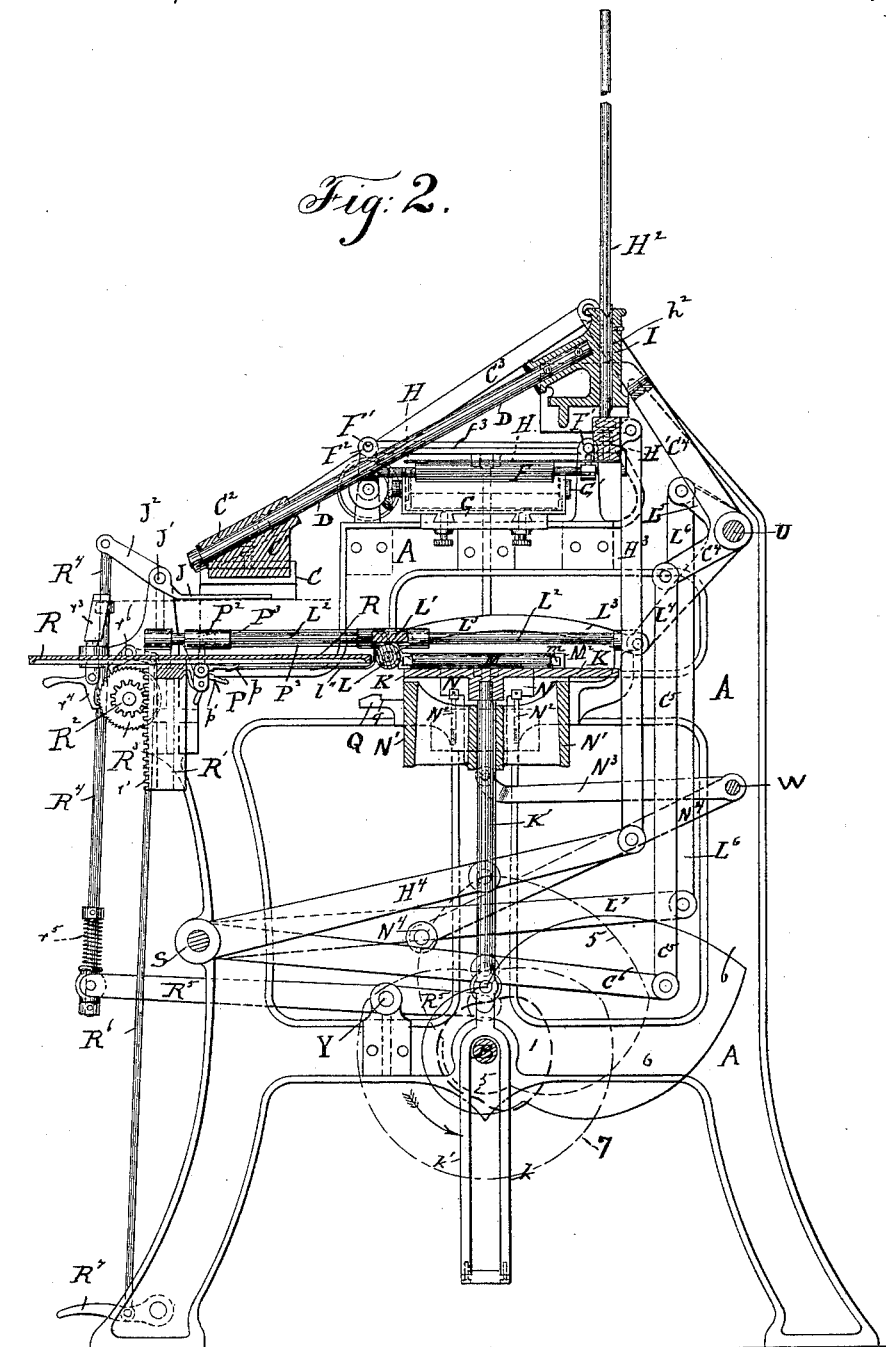

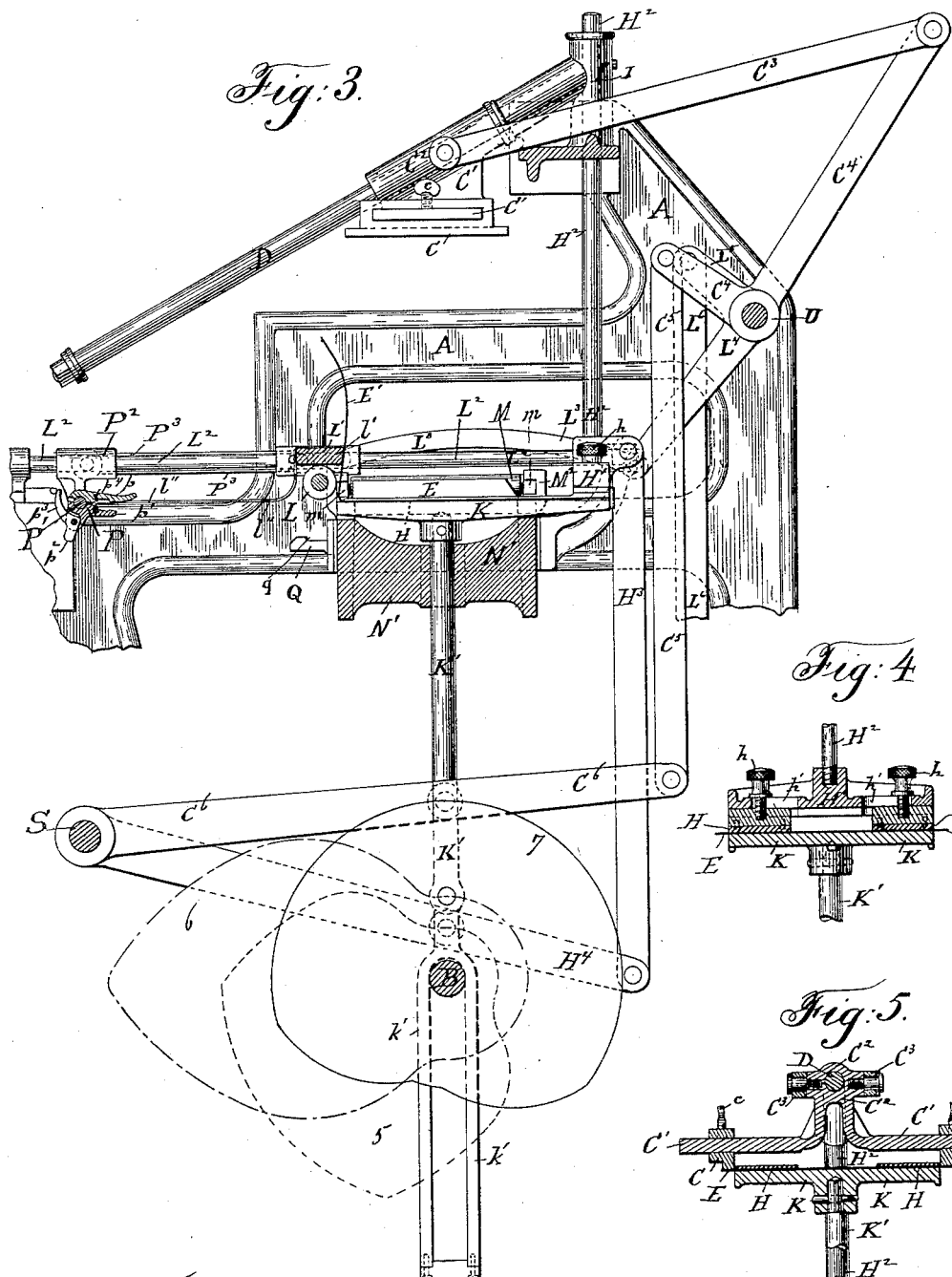

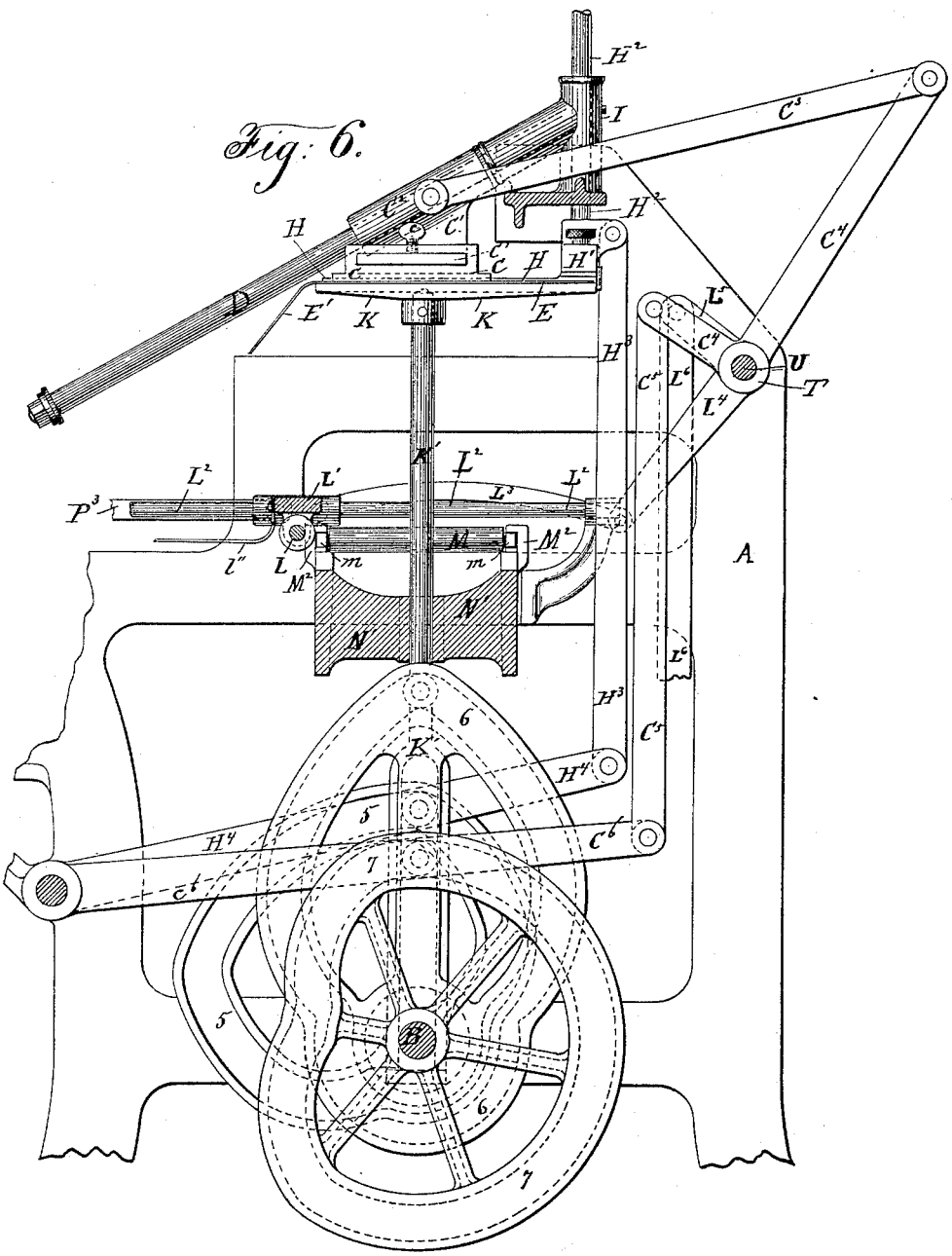

(No Model.) 9 Sheets—Sheet 5.

F. A. JONES.
ENVELOPE MACHINE.

No. 467,977. Patented Feb. 2, 1892.

Witnesses
John Becker
Charles E. Johnson

Inventor
Frank A. Jones
by James Law
Attorney.

(No Model.) 9 Sheets—Sheet 6.
F. A. JONES.
ENVELOPE MACHINE.

No. 467,977. Patented Feb. 2, 1892.

Witnesses:
John Becker
Charles E. Johnson

Inventor:
Frank A. Jones
by James Law
Attorney.

(No Model.)  9 Sheets—Sheet 7.

F. A. JONES.
ENVELOPE MACHINE.

No. 467,977. Patented Feb. 2, 1892.

Witnesses:
John Becker
Charles E. Johnson

Inventor:
Frank A. Jones
by James Law
Attorney.

(No Model.) 9 Sheets—Sheet 8.
F. A. JONES.
ENVELOPE MACHINE.
No. 467,977. Patented Feb. 2, 1892.
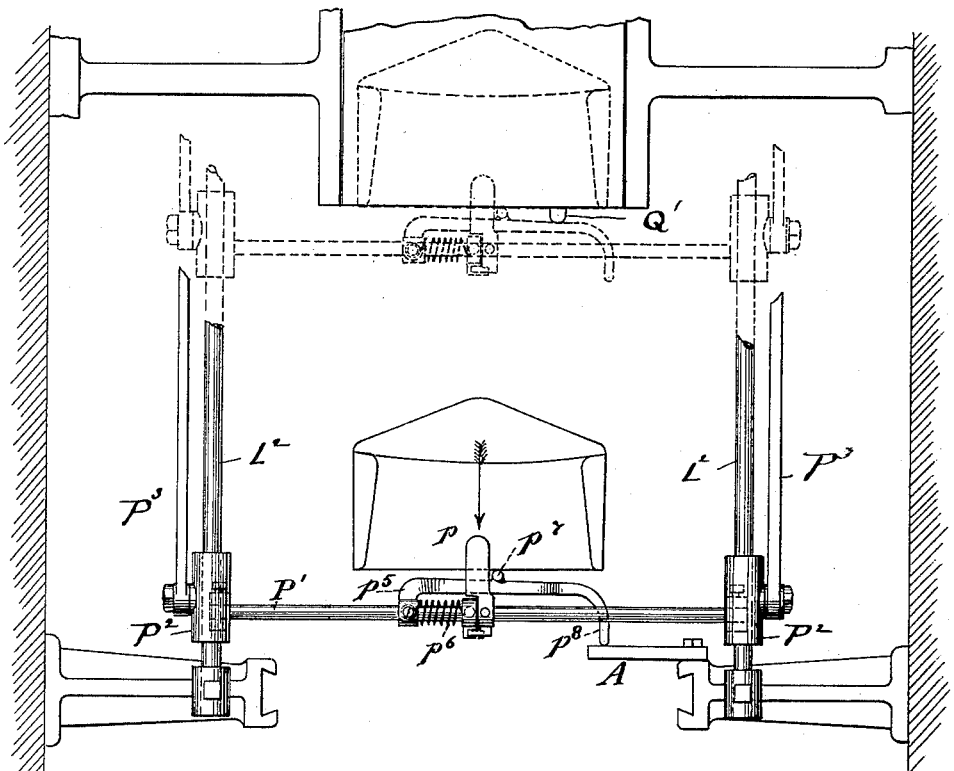
Fig. 13.
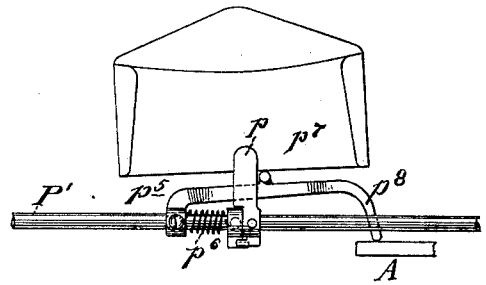
Fig. 14.
Fig. 15.
Witnesses
John Becker
Charles E. Johnson.
Fig. 16. Fig. 17.
Inventor
Frank A. Jones
by James Law
Attorney (No Model.) 9 Sheets—Sheet 9.

F. A. JONES.
ENVELOPE MACHINE.

No. 467,977. Patented Feb. 2, 1892.

Witnesses
John Becker.
Charles E. Johnson.

Inventor
Frank A. Jones
by James Shaw.
Attorney

UNITED STATES PATENT OFFICE.

FRANK A. JONES, OF NEW YORK, N. Y.

ENVELOPE-MACHINE.

SPECIFICATION forming part of Letters Patent No. 467,977, dated February 2, 1892.

Application filed June 9, 1888. Serial No. 276,590. (No model.)

*To all whom it may concern:*

Figure 1:
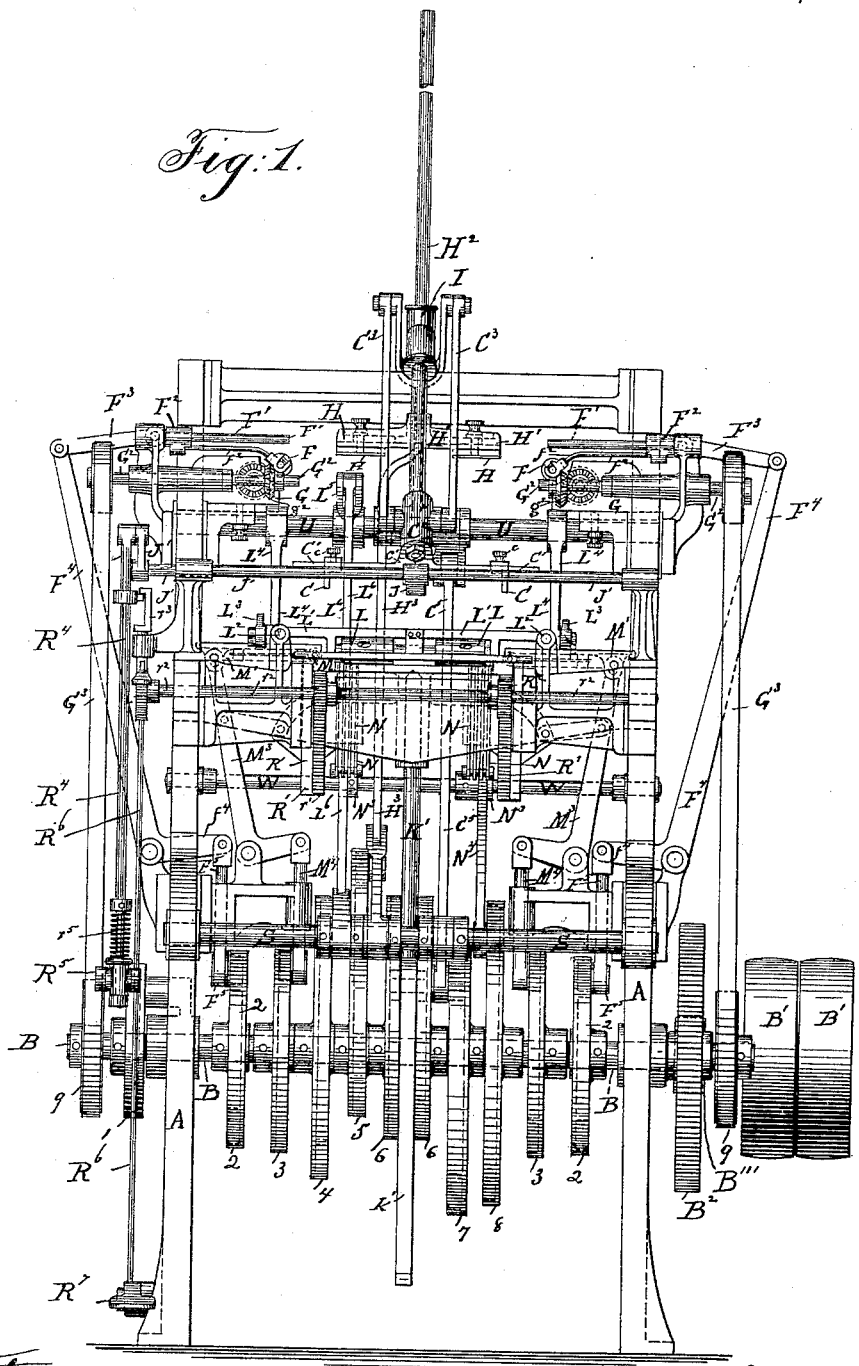
Figure 7:
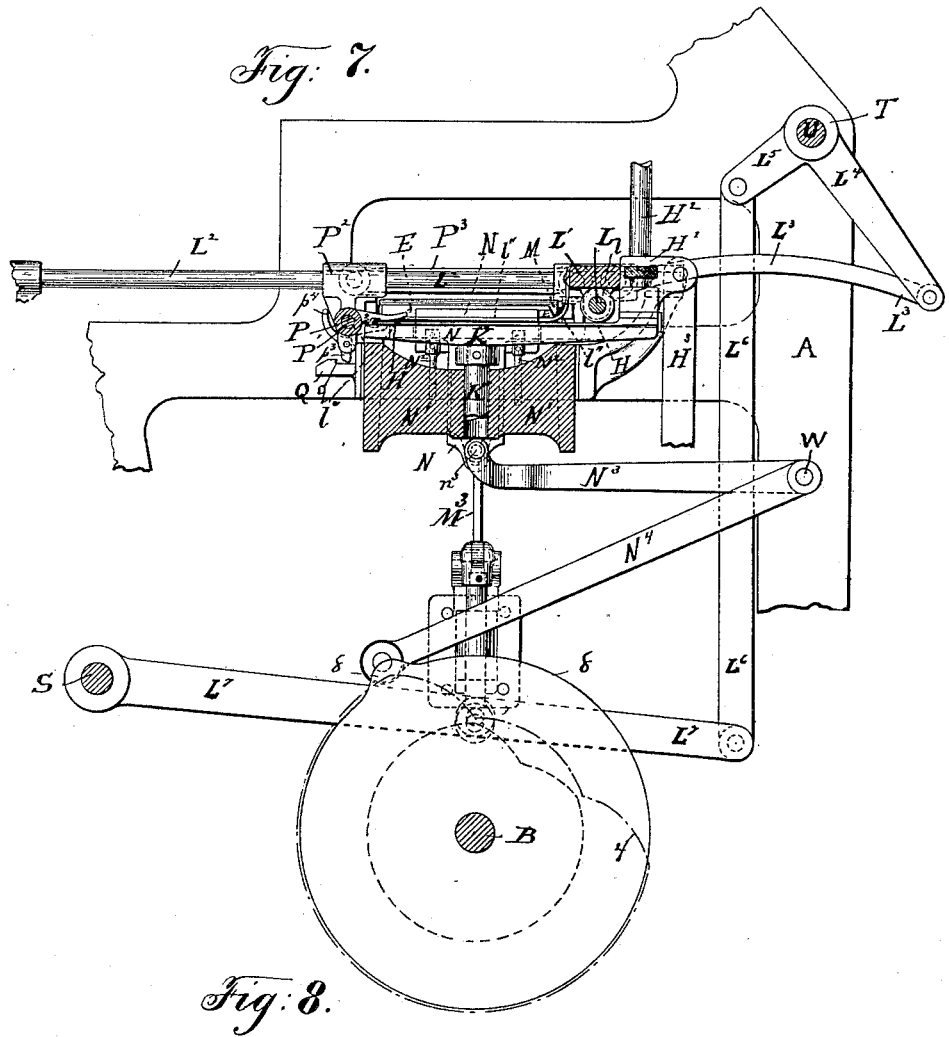
Figure 8:
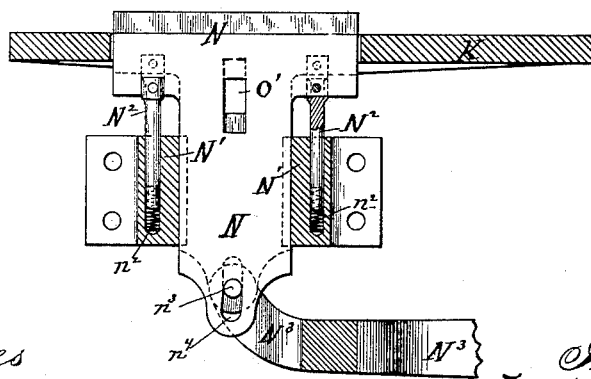
Figure 9:
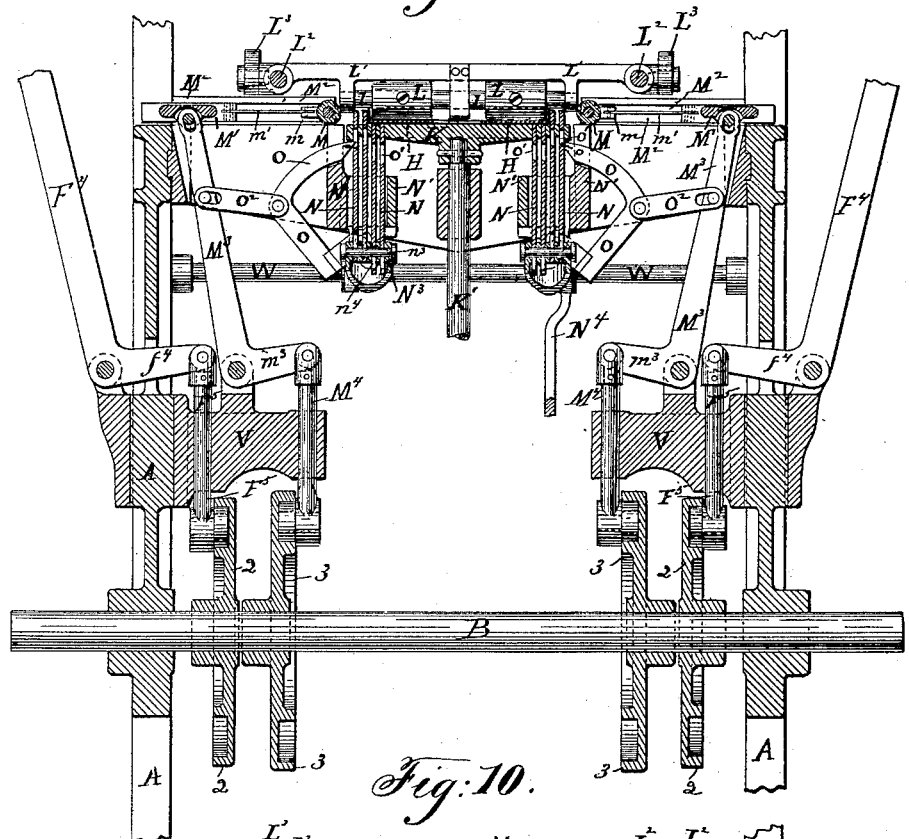
Figure 10:
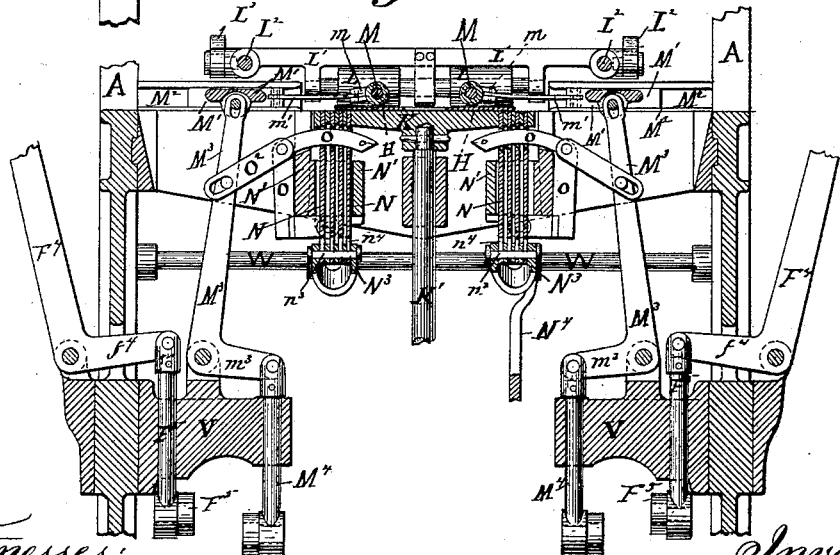
Figure 11:
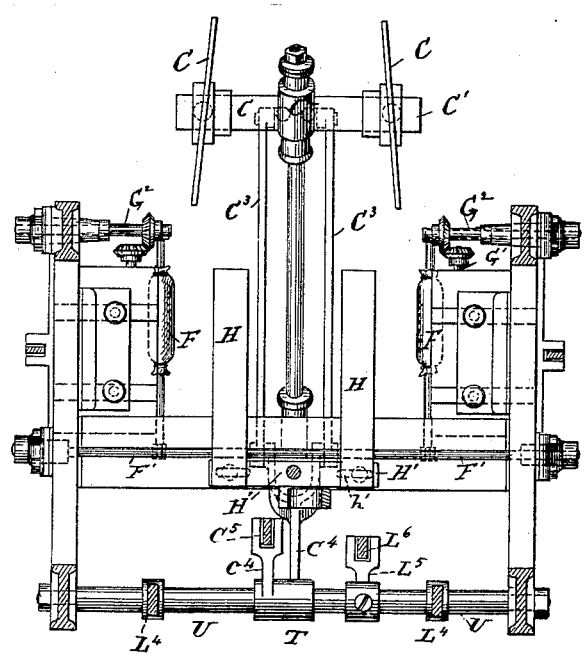
Figure 12:
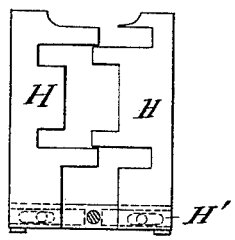
Figure 18:
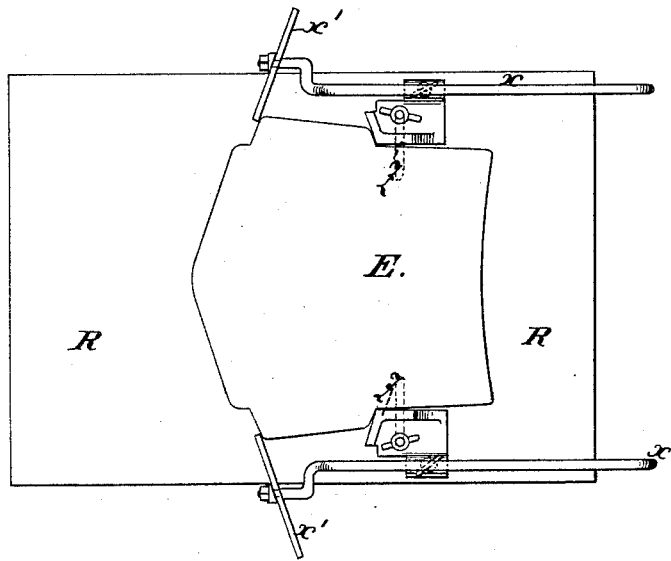
Figure 19:
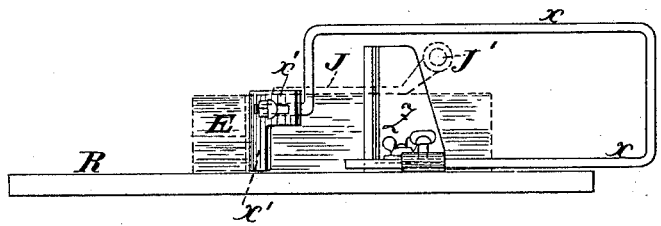

Be it known that I, FRANK A. JONES, a citizen of the United States, residing in the city of New York, in the State of New York, have invented certain new and useful Improvements in Envelope-Machines, of which the following is a full, clear, and exact description, reference being had to the accompanying drawings, making a part of this specification.
My invention relates to that class of envelope-machines in which blanks previously cut the desired shape and size are gummed and folded to form the envelopes, and is intended to produce a machine in which the gumming and folding mechanism may be regulated or adjusted so that envelopes of different sizes can be made on the machine without changing the several parts of the same.
In the drawings illustrating my improvements, in which like letters and numerals indicate like parts, Figure 1 is a front elevation of the machine. Fig. 2 is a side sectional elevation of the machine. Fig. 3 is a side sectional view of the upper part of the machine, showing the gummers and folding device and part of the mechanism for operating the same. Fig. 4 is a sectional view of the former around which the flaps of the envelope are folded and the bed on which the envelope-blank rests, showing the method of adjusting the same. Fig. 5 is a sectional view of the gummers, showing the method of adjusting the same in position on the bed, with the envelope-blank attached to the gummers and held between the former and bed. Fig. 6 is a side sectional view of the upper part of the machine, similar to Fig. 3, with the former and bed raised under the gummers and the mechanism for operating the same and for moving the gummers. Fig. 7 is a side sectional view of the folding device, showing one of the moving vertical plates and the mechanism for operating the same and for moving the end-folding roller and the detaching-grippers. Fig. 8 is a view of one of the vertical plates in position in the frame of the folding device and the end of the lever for moving the same. Fig. 9 is a front sectional view of the folding device, showing the mechanism for operating the side-folding roller and the vertical plates. Fig. 10 is the same as Fig. 9, showing the side-folding rollers moved in to fold the side flaps of the envelope-blank and all the vertical plates drawn down.
Fig. 11 is a view, looking upward, of the upper part of the machine, showing the plate $c'$ constructed narrower and the gummers enlarged and lowered to take up the envelope-blank and the former raised to receive the latter and the device for applying gum to the gummers, and showing the gum-rollers F shortened to apply gum to a part of the gummers only. Fig. 12 shows a modification of the former H. Figs. 13, 14, 15, 16, and 17 illustrate a modified construction and operation of the grippers or nippers P. Fig. 18 is a top view of a portion of the table with the pile of blanks in position on it, showing the guides for keeping the blanks in order and the separators for preventing more than one blank being lifted from the pile at a time. Fig. 19 is a side view of the pile of blanks on the table, showing the separators and the presser-foot J.

My invention consists, essentially, in constructing and arranging the gumming and folding mechanism of the envelope-machine so that they can be altered or adjusted to gum and fold different-sized blanks, and thus enable the machine to manufacture envelopes of various sizes without changing the parts.

It furthermore consists in a novel construction and operation of the various parts of the machine.

In my improved envelope-machine the blanks, previously cut the required size and shape, are lifted from the table on which they are placed by adjustable gummers adapted to apply the gum to various-sized blanks and are conveyed by the gummers in position over a bed or folding-plate on which the blanks are folded over an adjustable former by rollers arranged to pass over the sides and ends of the former and turn down the flaps of the blank and seal the same.

In the construction of the machine shown in the drawings, A is the frame supporting the various parts of the machine, and B is the main shaft, on which the several cams are mounted and which is turned by the pulleys B' by means of the cog-wheels $B^2$ and B'''.

The envelope-blanks, cut the desired shape and size, are placed in a pile on a vertically-moving table R at the front of the machine, which is arranged to rise automatically as the blanks are removed in order to keep the top of the pile of blanks always at the same level and in the right position to be acted upon by the gummers C. The top blank is removed from the pile by the gummers, which come down on the blank and apply the necessary quantity of gum to the edges of the flaps. As the gummers recede they carry the gummed blank up and back in position to be received by the folding device. These gummers (shown more at large in Figs. 3, 5, 6, and 11) consist of movable pieces C, attached to and arranged to move or slide on the flat plate C', so as to be adjustable on the same. The plate C' is attached to or formed into the inclined sleeve $C^2$ at the center, which encircles and loosely slides on the bar D, as will be seen from Figs. 3, 5, and 6. The gummers C, which are of the desired shape to apply the gum to the proper place on the flaps of the envelope-blank, move loosely on the plate C', as will be understood from Figs. 5 and 11, and are secured on the latter by the thumb-screws $c$. The gummers can therefore be moved away from or toward each other at pleasure and thus adjusted to apply the gum to blanks of different sizes.

As will be readily understood, any other mode of securing the gummers C so that they will be adjustable may be used in place of that shown in the drawings. The gummers C are suspended from the inclined bar D by means of the sleeve $C^2$, so as to readily slide back and forth or up and down on the latter. The bar D is situated at the top of the machine and extends from the back to the front of the same and is of such a length and so situated with respect to the several parts of the machine that when the gummers C are at the lower end of the bar, as shown in Fig. 2, they will rest on top of the pile of blanks on the table R, and when raised to the upper end of the bar, as shown in Figs. 3 and 6, the gummer will be above and directly over the folding device. The gummers thus move from the front of the machine back and up over the bed or folding-plate described farther on. The gummers C are moved up and down on the inclined bar D by the parallel arms $C^3$, Figs. 1 and 11, the outer ends of which are secured to the long arm of the bell-crank $C^4$, connected to the sleeve T, which revolves on the shaft U and which is turned by means of the rod $C^5$ and arm $C^6$ by the cam 7 on the main shaft B, as is shown particularly in Figs. 2, 3, and 6. As will be understood from Fig. 2, as the cam 7 revolves and lowers the arm $C^6$, engaging with it, the latter, which is connected at its front end with the shaft S, draws down the vertical rod $C^5$, attached to its rear end, and thus turns the bell-crank $C^4$, connected to the upper end of the rod $C^5$, so that the long arm of the crank pushes the arms $C^3$ toward the front of the machine and hence slides the gummer C down to the lower end of the bar D. As is shown in Figs. 3 and 6, when the cam raises the arm $C^6$ the latter pushes up the vertical rod $C^5$ and thus turns the bell-crank $C^4$ so as to throw the long arm of the bell-crank back and draw the arms $C^3$ toward the rear of the machine, and thus raise the gummers to the upper end of the bar D. Hence as the arm $C^6$ is raised by the cam the gummers are moved to the upper end of the bar D, and as the arm is lowered the gummers are moved down to the lower end of the bar. The shape of the cam 7 and its position on the shaft B are such that the gummers C are held at the upper end of the bar D while the envelope-blank is being folded and remain in their lower position at the bottom of the bar and on the pile of blanks only long enough to apply the gum to the blank and take hold of the latter to convey it, thus sliding down and back almost immediately and resting in their upper position at the top of the bar D. While the gummers C are raised and held in their upper position at the top of the bar D, the gum is applied to the bottom of the gummers by the gumming mechanism. This consists of the ordinary gum-boxes G, situated on each side of the machine, and the gum-rollers F, arranged to move from the gum-boxes directly under the gummers and apply the gum to the lower edges of the latter. Within the gum-boxes are the usual rollers G', Fig. 2, which distribute the gum evenly on the surface of the rollers F. These rollers G' are caused to revolve by the shafts $G^2$, which are turned by the belts $G^3$, passing over the pulleys 9 on the main shaft B. On the inner ends of the shafts $G^2$ are beveled cog-wheels $g^2$, which engage with similar wheels on the ends of the rollers G', as is fully shown in Figs. 1 and 11. As will be understood from these figures, as the shafts $G^2$ are revolved by the belts the rollers G' in the gum-boxes are turned and apply the gum evenly to the rollers F. The gum-rollers F are supported at each end, so as to freely revolve, by the horizontal parallel arms $f^2$, (shown in Fig. 1,) the outer ends of which are connected to the loose sleeves or rings $F^2$, which rest and slide on the parallel rods F' at the front and rear of the machine. As will be understood from Fig. 1, as the rings $F^2$ slide in on the rods F' toward the center of the machine the arms $f^2$, connected to the rings, carry the rollers F inward under the gummers C, and as the rings slide back toward the frame of the machine the rollers F are carried away from the gummers and against the rollers G' in the gum-boxes. The rod F' at the rear, which is omitted in Fig. 1 to make the drawing more distinct, extends across the machine, as shown in Fig. 11, the front rod, as will be seen from Fig. 1, extending inward from each side of the machine for such a distance as will insure the rollers F when the rings $F^2$ are at the inner ends of the rods passing under the gummers. The rings $F^2$, which are connected together by the transverse bar $f^3$, (shown in Fig. 2,)

are moved back and forth on the rods F' on each side of the machine by the arm F³, connected to the long arm of the bell-crank F⁴. This crank, which is pivoted to a suitable projection V on the frame of the machine, is turned by the cam 2 on the main shaft B, which engages with the vertically-moving rod F⁵, the upper end of which is connected to the short arm of the bell-crank, as shown in Fig. 1 and more fully in Figs. 9 and 10. As is seen in the latter figures, the vertical rods F⁵ slide in the brackets V, attached to the frame of the machine. As will be understood from the drawings, when the cams 2 revolve and push the vertical rods F⁵ upward the long arms of the bell-cranks F⁴ are thrown out from the sides of the machine and in moving slide the rings F², by means of the arm F³, to the outer ends of the rods F' and thus carry the gum-rollers F away from the gummers and against the gum-boxes. As the cams draw the rods F⁵ down the arms of the bell-cranks are turned in toward the machine and the rings F² moved in on the rods F' and thus the rollers F carried by the arms $f^2$ under the gummers. The arrangement of the cams 2, which move the gum-rollers F with respect to the cam 7, which raises the gummers C, is such that the rollers are moved in toward the center of the machine after the gummers have been raised to their upper position at the top of the bar D and immediately before the gummers descend to take up a fresh blank. The rollers F, which should be just large enough to touch the lower edges of the gummers in passing under the same, are held in the arms $f^2$, so that they can be readily removed and new rollers inserted when it is desired to apply the gum to different parts of the gummers.

In place of inserting new rollers any convenient arrangement of gum-rollers may be employed to apply the gum to the parts of the gummers desired.

The gummers C, described above, perform the office of gummers, pickers, and conveyers, applying the gum to the envelope-blank, picking up the blank from the pile on the table, and conveying it to the part of the machine where it can be acted upon by the folders.

In my invention the envelope-blank is folded over a former by rollers arranged to pass over the former and turn down the flaps, and the folding apparatus consists, essentially, of a vertically-moving bed or folding-plate, which receives the blank from the gummers and on which it rests while being folded, an adjustable former adapted to move up and down and hold the blank on the bed and crease the flaps where they are to be folded, rollers arranged to pass over the sides and ends of the former and turn down or fold the flaps of the blank over the same, and mechanism for raising the ends of the flaps to insure the rollers folding them over the former.

In the construction of the machine shown in the drawings the former, over which the flaps of the blank are folded, consists of two flat strips of metal H, Fig. 11, attached at one end to the cross piece or head H', so as to be movable on the same. As will be seen in Fig. 4, the strips H are secured to the head H' by screws $h$, which pass through slots $h'$ in the head, and consequently the strips H can be moved away from or toward each other in the head H' and thus adjusted to fold different-sized blanks.

In place of the former shown in Figs. 1 and 11, consisting of the straight strips the strips H H may be constructed, as shown in Fig. 12, so as to interlock or fit into each other and thus extend over the entire surface of the blank. The former-head H' is attached to the lower end of a vertical bar H², which freely slides in the head I at the top of the machine, and is prevented from turning in the same by the feather $h^2$ and which serves to steady and control the movement of the former and hold it directly over the bed or folding-plate. The former is located directly below the gummers C when the latter are raised to the upper end of the bar D, and moves up and down between the gummers and the bed or folding-plate K. This vertical movement is imparted to the former by the rod H³, the upper end of which is secured to the former-head H' and the lower end to the lever H⁴, which turns on the shaft S and engages with the cam 5 on the main shaft B. (Shown in Figs. 2, 3, and 6.) As will be seen from Figs. 2 and 6, as the cam raises the inner end of the lever H⁴ the latter pushes up the rod H³ and thus moves the former H H' to the top of the machine. As the cam revolves and lowers the lever H⁴ the latter draws down the rod H³ and moves the former H H' to its lower position between the folding-rollers, as is shown in Fig. 3. The former H is so situated with reference to the gummers C that when both are in their upper positions at the top the machine they will be in the same plane with each other and the former H H will occupy a position within the gummers C, as is shown in Fig. 5. The arrangement of the cams 5 and 7 on the shaft B is such that the former H is raised to its upper position before the gummers C raise from the pile of blanks, as will be seen from Fig. 2. The former is thus in position at the top of the machine before the blank is carried up from the table, and hence as the blank is conveyed upward by the gummers it passes under the former H H, where it is held by the gummers C.

Immediately below the former and moving up and down like the latter is the bed or folding-plate K, on which the envelope-blank lies as it is being folded. This bed K, when in its lower position rests on the frame N' between and just below the folding-rollers L and M, as shown in Figs. 2, 3, 7, 9, and 10. The bed K is moved up and down by the rod K', the lower end of which is forked and engages with the double cam 6 on the shaft B. As will be understood from the drawings, as the cam 6 revolves the rod K' is pushed up and raises the bed K from its position between the folding-rollers until it comes in contact with and rests against the former H H, as shown in Fig. 6. As is seen in the latter figure, the envelope-blank E is now held between the former H H and the bed K. The cam 6 then lowers the bed at the same time that the cam 5 draws down the former H H. The bed and former thus descend together, with the envelope-blank between them, the former stripping the blank from the gummers as it goes down until the bed and former rest in position between the folding-rollers L and M, as shown in Fig. 3. The arrangement of the cam 6, which moves the bed K, with respect to the cams 5 and 7, which move the former H H and gummers C, is such that the bed is raised after the gummers C, and hence after the former H, are in their upper positions and is lowered at the same time and together with the former H. The envelope-blank as it is held between the former and the bed lies in position to be folded by the folding-rollers, with the bottom flap E' extending out from the ends of the former H H toward the front of the machine, as shown in Fig. 6, and as the pile of blanks is held in the same place on the table R and each blank is picked up and conveyed by the gummers in the same manner the blanks always lie with the bottom of the envelope, as folded, in the same position on the bed K.

In the construction shown in Fig. 3 as the bed and former descend with the blank the outer ends of the former H H pass close to a flat bar $l'$ on the frame L' of the bottom-folding roller, and thus crease or turn up the bottom flap E' of the blank in position to be turned over and further folded by the roller. This method of creasing the bottom flap is not necessary, however, and the flap may merely rest on the roller, when it will be turned over and folded by the roller as the latter passes over the former. The bed K and former H having descended between the rollers L and M so that the bed rests on the frame N', the blank is held on the bed in position to be folded over the former H. The bottom flap E' of the blank, having been creased or turned up by the ends of the former in descending, as shown in Fig. 3, or merely resting on the roller, is first turned or folded over the ends of the former H by the bottom roller L. This roller L is situated just in front of the outer ends of the former H as the latter descends with the bed K, as is shown in Figs. 2, 3, and 6, and is arranged to pass from the front to the rear of the machine over the former, as will be seen from Fig. 7. The roller L is supported and turns in journals on a frame L', Figs. 1, 9, and 10, which rests and slides on the two parallel bars $L^2$ at each side of the machine. The frame L' is moved back and forth on the bars $L^2$ by the arms $L^4$, connected at one end with the rock-shaft U at the rear of the machine, Fig. 1, and pivoted at their other or lower ends to the curved rods $L^3$, which are secured to the ends of the frame L'. The rock-shaft U is turned by the crank $L^5$, the outer end of which is connected with the vertical rod $L^6$, which is attached at its lower end to the lever $L^7$, which turns on the shaft S and engages with the cam 4 on the main shaft B.

As will be understood from Fig. 7, when the cam revolves so as to lower the lever $L^7$ the crank $L^5$ is drawn down by the vertical rod $L^6$ and the rock-shaft U turned so as to swing the arms $L^4$ backward from the machine. The latter in moving by means of the rods $L^3$ slide the frame L' on the parallel bars $L^2$ toward the rear of the machine and thus move the roller L from its position in front of the former H H over the latter, so as to turn down and fold the bottom flap E' of the blank. As the lever $L^7$ is raised by the cam the crank $L^5$ is pushed up and the rock-shaft U turned in the opposite direction, so as to swing the arms $L^4$ forward and slide the frame L' on the bars $L^2$ toward the front of the machine and thus move the roller L back to its position in front of the former H H, as is shown particularly in Fig. 2.

The form of the cam 4, which moves the roller L, is such that the roller remains stationary in the position shown in Figs. 2, 3, and 6 at the outer ends of the former H H until the bed K and former, together with the blank, descend behind the roller, when the roller moves across the former toward the former-head H' or toward the rear of the machine, as shown in Fig. 7, and remains there until the side flaps of the envelope are folded.

To prevent the bottom flap of the envelope rising after it has been folded and to hold it down on the former until the side flaps are turned down upon it, a wire or strip of metal $l''$ is attached to the frame L' and extends toward the front of the machine, where it may be connected with the grippers P. As the roller L turns down the flap and passes over it the metal strip $l''$ rests on the latter and holds it down, as will be seen from Fig. 7.

In the construction shown in the drawings the bottom-folding roller is double, as shown in Figs. 1, 9, and 10, consisting of the two rollers L L, mounted on the journal $l$. The rollers L L may be made adjustable on the journal, if desired, and in place of the two rollers one long roller can be used. The bottom flap of the envelope having been folded by the roller L and being held down by the metallic strip $l''$, the side flaps of the blank are turned down and folded over the sides of the former H H by the side rollers M, situated on each side of the former and arranged to roll toward each other over the latter. The rollers M are mounted on movable frames $m$, which are connected by flexible rods or narrow metallic strips $m'$, Figs. 9 and 10, with sliding plates M' on each side of the roller, arranged to slide back and forth in the recesses $M^2$. As will be seen from Figs. 9 and 10, the sliding plates M' are pivoted to the long arms of the bell-cranks M³, which turn on the brackets V, the short arms of which are connected with the upper end of the vertical sliding rods M⁴, arranged to move up and down in the brackets. The lower end of these rods engage with the cams 3 on the main shaft B, so that the rods are moved up and down and the bell-cranks turned by the revolution of the cams. As is shown in Fig. 9, when the rods M⁴ are raised the long arms of the bell-cranks M³ are thrown outward and the sliding plates M′ moved toward the sides of the machine and the frames m and rollers M drawn back to the sides of the bed K and of the former H H in position to turn down the flaps of the envelope. When the cams 3 lower the rods M⁴, the long arms of the bell-cranks are thrown inward and the sliding plates M′ moved toward the center of the machine and the rollers M pushed over the bed K and former toward each other, as shown in Fig. 10, thus turning down the side flaps of the envelope. The construction and operation of cams 3, which move the side rollers M with respect to that of cam 4, which moves the bottom roller L, is such that the latter roller after it has moved over the former and turned down the bottom flap of the envelope remains stationary at the back of the bed or at the former-head H′ until the side rollers M move across the bed and former and back again to their position at the side of the latter, when the roller L moves back to its position at the front end of the former. The bottom roller thus moves over the bed and former, remains at the back of the latter as the side rollers move across the bed and former and back again, and then returns to its first position in front of the former. As the frames m, and hence the rollers M, are held by the flexible rods or strips m′, the rollers are capable of rising as they pass over the former and envelope-blanks, as shown in Fig. 10, and thus accommodating themselves to blanks or different thickness, and the spring of the rod or strips m′ presses the rollers onto the former with sufficient force to crease and fold the blank and seal the flaps. These folding-rollers L and M may be constructed of soft rubber or metal covered with rubber or of other material, as is found desirable.

Where the envelope-blank is of such a small size that the side flaps do not rest on the rollers M as the blank lies on the bed K, but lie within the rollers, it is necessary to lift the outer ends of the flaps from the bed to insure the rollers M passing under them, so as to turn the flaps over the sides of the former and prevent all danger of the rollers passing over the gummed or inner side of the flaps. In the construction of the machine shown in the drawings this is accomplished by the vertical sliding plates N, (shown in Figs. 2, 7, 8, 9, and 10,) which are supported and move in the frames N′ immediately below the bed K and on each side of the latter and are arranged to pass up through slots in the bed in front of the rollers M and thus lift the ends of the flaps above the latter and to be drawn down below the bed as the rollers pass over the bed and former, and held there, so as not to interfere with the free movement of the rollers. As will be seen from Figs. 7 and 8, the central part of the plate N extends through and below the frame N′ and the plate rests or is supported on the rods N², attached to the plate and inserted in the holes n′ in the frame. At the bottom of the holes n′ are springs n², on which the rods N² rest and by means of which the rods, and consequently the plates, are pushed up in the frame N′ through the slots in the bed, as is shown in Fig. 8. The tendency of the springs n², therefore, is to move the vertical plates N up through the slots in the bed K as soon as the downward restraining force on the plates N is removed. The vertical plates N are drawn down through the slots in the bed K or caused to slide downward in the frames N′ by the hooks O. (Shown more clearly in Figs. 9 and 10.) These hooks, which are pivoted to the bottom of the frames N′, are situated on each side of the frames and are arranged to turn or swing toward and away from each other or toward the center and the sides, respectively, of the machine. The upper parts of the hooks, which are curved, as shown, are adapted to enter and engage with slots O′, Fig. 8, in the plates N as the hooks swing toward each other and thus draw down the plates successively below the bed K. The slots O′ in the several plates are arranged in a line corresponding with the curve of the upper part of the hook O, so that when the latter has drawn down the plates the tops of all the plates will be in a horizontal line and immediately below the bed K, as shown in Fig. 10, and the hook O is so situated with respect to the slots O′ that when the hook is withdrawn from the latter and the plates are pushed up by the springs n² the points o of the hooks will be just above the bottom of the slots and thus ready to enter the latter as the hooks swing forward, as will be seen from Fig. 9. The hooks O are connected to and moved by the long arm of the bell-cranks M³, which move the side rollers M by means of the arms O². The hooks O are thus moved forward at the same time with the side-folding rollers and the plates N drawn down as the rollers M fold the flaps of the envelope. The operation of the hooks O will be readily understood from Figs. 9 and 10. As is shown in Fig. 10, when the long arm of the bell-crank M³ swings forward and moves the roller M over the bed K and former H H to fold the envelope it swings the hook O inward toward the plates N, and the point of the hook, entering the slots O′ in the plates, successively draws the plates down until the hook has passed through all the slots, when the plates will all have been drawn below the bed K. The point of the hook as the latter swings inward is situated just in front of the vertical plane of the roller M. Hence the hook enters the slot and draws down each plate as the roller approaches it and just in time to clear the roller and allow it to pass over the bed K. As the arm of the bell-crank swings outward and draws back the roller M to its position at the side of the former H it withdraws the hook O from the slots O' and swings it back, as is seen in Fig. 9, and holds it in position to enter the slots again when it is moved inward. The plates N are thus drawn down through the slots in the bed K separately as the curved hook enters the slot in each, the plate next to the roller being drawn down first. Hence the inner plate remains up until the roller approaches it and thus keeps the flap of the envelope raised until the roller is in a position to turn it over and fold it.

In order not to interfere with the movement of the bottom roller L over the bed K, the plates N after they are drawn down by the hooks O are held below the bed K until just before the rollers M move to fold the envelope, when the plates N rise up through the slots in the bed to lift up the side flaps of the envelope and permit the rollers M to pass under them. The plates N are held down by the two horizontal levers $N^3$, (shown in Figs. 2 and 7,) which are connected to the rock-shaft W at the rear of the machine and are arranged to move up and down in a vertical plane under the frames N'. The inner or forward ends of the levers $N^3$ are attached to the lower ends of the several plates N in the two frames N' by the pin $n^3$, (shown also in Figs. 8, 9, and 10,) which passes through the elongated holes or slots $n^4$ in the lower ends of the plates, as will be seen in Fig. 8. The plates N can thus move up and down on the pin $n^3$ independently of each other, but are all held down together when the pin $n^3$ is drawn down to the bottom of the slot $n^4$, as will be understood from Fig. 10. The rock-shaft W is turned and the inner end of the lever moved up and down by the crank $N^4$, the lower end of which engages with the cam 8 on the main shaft B, Figs. 1 and 7. When the cam lifts the end of the crank $N^4$, the rock-shaft is turned so as to raise the inner end of the levers $N^3$ and slide the pins $n^3$ up in the slots $n^4$. The downward hold on the plates N is now released, and the plates are pushed up in the frames N' through the slots in the bed K by the springs $n^2$ under the rods $N^2$. As the cam 8 revolves and lowers the crank $N^4$ the rock-shaft is turned and moves the end of the levers $N^3$ down and slides the pins $n^3$ to the bottom of the slots $n^4$. The plates N are now held down and prevented from rising by the levers $N^3$.

The arrangement and operation of cam 8 with respect to cams 3, which moves the rollers M and hooks O, are such that the levers $N^3$ are raised and the hold on the plates N released just before the cams 3 move the rollers M to fold the side flaps of the envelope, and thus the plates N are allowed to be pushed up by the springs in time to lift the flaps above the rollers, and the lever $N^3$ is lowered and the pin $n^3$ moved down in the slots $n^4$ immediately after the hooks O have passed through the slots O' and drawn down the plates N, and just before the cams 3 withdraw the hooks O from the slots O' and move back the rollers M. The plates N are thus raised and moved upward through the slots in the bed K by the springs $n^2$, the hold of the levers $N^3$ having been released, and are drawn down by the hooks O and are afterward held down by the levers $N^3$ after the hooks O have been withdrawn from the slots in the plates. These vertical plates N may be of any number found desirable. The former H H, as it is adjusted to fold different-sized envelopes, may lie within all the slots on the bed K and thus allow all the plates N to rise through the slots, or it may cover some of the slots, as shown in Fig. 9, and thus prevent the inner plates from rising, or may cover all the slots, in which latter case the blank would be of such a size that the side flaps would rest on the rollers M. The bottom and side flaps of the envelope-blank having been folded over the former H H by the rollers L and M, the completed envelope is removed from the bed K and pulled off from the former H, over which it is folded by the grippers P. (Shown in Figs. 2, 3, and 7.) These grippers are attached to the bar P', suspended at each end from the movable rings or collars $P^2$, which are arranged to slide back and forth on the parallel rods $L^2$ and are connected and move with the frame L' by the side bars $P^3$. (Shown in part in Fig. 6.)

In the construction shown in Figs. 2, 3, and 7 the grippers P consist of the two jaws $p$ $p'$, the lower of which $p'$ is hinged to the upper one, so as to open and close, and is provided with the projections $p^2$ and $p^3$. A small spring $p^4$ between the jaws holds them closed when not opened by the projections $p^2$ and $p^3$. As the collars $P^2$ are connected to the frame L', on which the roller L is mounted by the side bars $P^3$, the grippers P move back and forth with the roller L. Hence as the roller passes over the former and turns down the bottom flap of the envelope the grippers P move after the roller, and the length of the bars $P^3$ is such that when the roller L has passed across the former and is at the head end H' of the latter the grippers P will be at the bottom of the envelope and will have grasped the same ready to pull it from the bed, as is shown in Fig. 7. As will be seen from Figs. 3 and 7, as the grippers move toward the bed-plate K and just before they reach the envelope on the latter the projection $p^2$ strikes the latch Q, fastened on the frame N', and opens the lower jaw $p$ of the grippers, so that the two jaws slide above and below the envelope. As the grippers reach the envelope the projection $p^2$ drops down on the other side of the latch and the jaws seize the envelope and hold it, as is shown in Fig. 7. The grippers remain in this position while the side flaps of the envelope are folded by the rollers M and until the envelope is completed. The roller L, and consequently the grippers P, are then moved back to their former positions, and as the latter moves back they carry the envelope back with them just in advance of the roller L until the grippers have reached their first position and the envelope is moved clear of the bed K. The projection $p^3$ now strikes a pin on the frame of the machine, as shown in Figs. 2 and 3, and opens the lower jaw of the grippers, and the envelope drops out into a suitable receptacle beneath.

In place of the gripper shown in Figs. 2, 3, and 7 I prefer the construction of the gripper illustrated in Figs. 13, 14, 15, 16, and 17. The gripper there shown consists of the two movable jaws $p$ and $p'$, hinged on or around the rod P'. A spring $p^6$ holds the jaws together when they are not separated or forced apart, as described below. The jaws are opened or separated by the rod $p^5$, which is pivoted to the rod P' on one side of the gripper and, passing through the jaws, terminates on the other side in the curved end $p^8$, as will be understood from Figs. 14 and 15. When this rod $p^5$ lies at the bottom of the jaws and next to the rod P', as in Fig. 16, the jaws $p$ and $p'$ of the gripper are held together or in contact with each other by the spring $p^6$. When the rod $p^5$ is pushed out or away from the rod P', the jaws are forced open or separated, as shown in Fig. 17. On the rod is a pin $p^7$, which pushes the envelope out of the jaws and thus assists in removing it.

The operation of the gripper is as follows: The gripper is drawn toward the folded envelope on the table, as above described, with the jaws held open by the rod $p^5$. As the gripper arrives in front of the table with the jaws on each side of the envelope the rod $p^5$ strikes a projection Q' on the frame of the machine, as is shown by the dotted lines at the top of Fig. 13 and is pushed in or toward the rod P'. The jaws $p$ and $p'$ are then closed and held on each side of the envelope by the spring $p^6$. The rod P' now moves back, carrying the envelope in the jaws of the gripper until the curved end $p^8$ of the rod $p^5$ strikes the frame at A, as shown in Fig. 13, when the rod $p^5$ is pushed out, as in Fig. 14, thus opening the jaws and freeing the envelope, the pin $p^7$ assisting the envelope to leave the gripper.

The table or platform R, on which the pile of blanks rests and from which they are removed by the gummers C, is the ordinary table, having an intermittingly-upward movement used in this form of envelope-machines where the gummers do not descend below a fixed point, and is arranged to rise automatically as the blanks are removed from the pile in order to keep the top of the pile at the same level to insure the gummer always coming down upon and resting on the top blank of the pile. As will be seen from Figs. 1 and 2, the table R is supported on the movable posts R', which are provided with cogs $r'$, which engage with the cog-wheels $R^2$ on the rod $r^2$, extending across the machine. On one end of this rod is a ratchet-wheel $R^3$, by which the rod is turned and the table raised. The table is moved up automatically by the vertically-moving rod $R^4$ at one side of the machine, the upper end of which operates the ratchet $r^4$, which engages with and turns the ratchet-wheel $R^3$. The rod $R^4$ is connected at its lower end with the horizontal lever $R^5$, which is supported and turns on the fulcrum Y and whose inner end engages with the cam 1 on the shaft B. As will be understood from Figs. 1 and 2, as the cam raises the inner end of the lever the outer end draws down the rod $R^4$, and as the inner end of the lever is lowered the outer end raises the rod. The ratchet $r^4$ is attached to the lower end of the hook $r^3$, which is moved up and down in the frame A, near the upper end of the rod, by a collar on the latter, as is shown in Fig. 2. As the rod $R^4$ is drawn down the collar on the latter presses down the hook $r^3$ and causes the ratchet $r^4$ to engage with one of the teeth on the ratchet-wheel $R^3$ and turn the latter and by means of the wheel the rod $r^2$, by which the posts R' and the table R is raised. As the table $R^4$ is raised the ratchet is moved up in position to engage with the next tooth on the wheel $R^3$. A pawl-stop $r^6$ engages with and holds the wheel $R^3$ as the ratchet $r^4$ releases the same to engage with another tooth on the wheel. The pawl $r^6$ is withdrawn from the wheel $R^3$ by the rod $R^6$, which is operated by the foot-lever $R^7$. When it is desired to lower the table R to insert a fresh supply of blanks, the lever $R^7$ is depressed and the pawl $r^6$ withdrawn from contact with the wheel $R^3$ by the rod $R^6$ and the ratchet $r^4$ withdrawn from the wheel, when the table can be pushed down or lowered as far as is desired. A crank or wheel (not shown in the drawings) may be connected to the other end of the rod $r^2$, by which the table can readily be lowered to insert a fresh supply of blanks and afterward move the table up in position under the gummers.

It may not always be necessary or desirable to raise the table every time a blank is removed from the pile by the gummers. Where the envelopes are of thin paper, a number of blanks may be removed from the pile without lowering the top of the latter below the gummers, and hence the table need not be raised until a sufficient number of blanks have been removed to render it necessary to move the pile up to meet the gummers.

To control the movement of the table and prevent it being raised by the rod $R^4$ and ratchet $r^4$ every time the rod is moved down by the lever $R^5$, I employ a stop or presser-foot J, which is operated by the rod $R^4$ in such a manner that the foot is brought down and presses upon the pile of blanks as the rod commences to rise, and prevents it moving up far enough to operate the ratchet-wheel as long as the top of the pile of blanks can be reached by the gummers. As will be seen from Fig. 1, the presser-foot J is secured to the oscillating rod J', which extends across the machine and is supported in journals on the the frame A. One end of this rod J' is connected with the top of the rod R⁴ by the crank J². As will be understood from Fig. 2, when the rod is drawn down the crank J², turns the oscillating rod J' and raises the presser-foot J from the pile of blanks, so that the top blank can be removed by the gummers. As the rod R⁴ is raised by the lever R⁵ the crank J² brings the presser-foot J down on the pile of blanks, as shown in Fig. 2, and when the blanks are at the right height to be acted upon by the gummers the foot J, pressing on the pile, arrests the further movement of the rod or prevents it moving up so far as to allow the ratchet to engage with the next tooth on the ratchet-wheel in order to move the latter. When, however, the top of the pile of blanks is below the level of the gummers, the foot J is turned down so far before it rests on the pile that the rod R⁴ can move up and permit the ratchet to operate the ratchet-wheel and thus raise the table. A spring $r^5$ on the lower end of the rod R⁴ allows the lever R⁵ to move upward when the rod is held down by the foot J. The drawings show but one presser-foot J; but there may be two or more, if desired.

To prevent more than one blank being raised at a time by the gummers, I employ the separators X, Figs. 18 and 19. As shown in these figures, these separators consist of bent wires or rods X, attached to the guides Z at each side of the table R, so as to be adjustable on the same. The wires or rods X, which are bent up and around, as shown in Fig. 19, so as not to interfere with the pile of blanks E on the table, are connected at their free or inner ends with the separators proper X'. As will be understood from Fig. 19, the inner edges of these separators X' rest against the edge of the blanks and as one blank is removed hold back the others and thus prevent more than one blank being raised by the gummers at a time. The separators X' are adjustable on the wires X, so that they can be moved to accommodate blanks of different widths, and the wires X may be adjusted where they are secured to the guides Z to accommodate blanks of different depths, and vice versa. As the blanks lie on the table they are held between the guards Z and the separators X', as will be seen from Fig. 18, and are thus kept in the right position to be acted upon by the gummers. As shown in the drawings, the guides Z are fastened to the table, so that they can be adjusted on the same to accommodate different size blanks.

The operation of my improved envelope-machine constructed as above described is as follows: While the gummers C are raised to the top of the bar D, as shown in Fig. 3, and just before they descend, the gum-rollers F are moved below the gummers and apply gum to the lower edges of the latter. The gummers then descend to the lower end of the bar D and rest on the pile of blanks on the table R, as shown in Fig. 2, and apply the gum to the edges of the side flaps of the envelope-blank. As the gummers descend the former H rises from the folding-bed K to their upper position at the the top of the machine, Fig. 2. The gummers now ascend (the presser-foot J rising from the pile of blanks to permit the top blank to be removed) to the upper end of the bar D, carrying the top blank E from the pile on the table with them and bringing the blank immediately below the former as the latter remains in position between the gummers and in line with them, as will be seen from Fig. 5. The bed K is next moved upward from between the folding-rollers until it rests against the former H, as shown in Figs. 5 and 6. The blank E is now held between the former H on top and the bed K below. The former and bed now descend, stripping the blank from the gummers and carrying it down between the folding-rollers to be folded. As the blank is thus carried down the bottom flap E' rests on the bottom roller L ready to be folded by the latter. The bed K, together with the former, having descended to its position between the rollers, the bottom roller L moves over the former to the head H' of the latter, turning the bottom flap E' of the envelope over the ends of the former and holding it down by the spring-strip l'' at the same time as the grippers P move toward the envelope and seize it, as shown in Fig. 7. The vertical plates N now rise through the slots in the bed K, Fig. 9, and lift the ends of the side flaps above the rollers M as the latter move across the former H and turn over and fold the side flaps of the envelope and gum them down on the bottom flap, as shown in Fig. 10, the plates N descending through the slots as the rollers M approach them. The rollers L and M now having folded and sealed the envelope, the rollers M move back to their position at the sides of the bed K and the roller L moves back to the front of the former H, the grippers P drawing the completed envelope out from the former until clear of the latter, when it allows it to fall into the receptacle below. Fresh gum is then applied to the gummers and the operation repeated as before.

What I claim as new is—

1. In an envelope-machine in which the blanks are previously cut the required size, the combination of the gummers C, adapted to be adjusted to suit envelope-blanks of different sizes and arranged to apply the gum on the blank and convey the latter over the folding apparatus, the former H, adapted to be adjusted to fold blanks of different sizes and arranged to move up and down and strip the blank from the gummers and carry it, in connection with the bed K, down to the folding-rollers, the bed K, arranged to move up and down under the former and receive the blank and hold it while it is folded, and the folding-rollers M and L, arranged to move over the bed and former and turn down and fold the flaps of the blank and seal the same, substantially as set forth.

2. In an envelope-machine in which the blanks are fed up to the gummers, the combination, with the table R, having an intermittingly-upward motion, on which the pile of blanks rest, of the slanting bar D and the adjustable gummers C, adapted and arranged to slide on the bar and apply gum to the blank and pick up and convey the same in position over the folding apparatus, substantially as and for the purposes set forth.

3. In an envelope-machine, the combination, with the adjustable gummers C, arranged to move on the slanting bar D, and the bar D, of the gum-rollers F, mounted on the arms $f^2$ and adapted to receive gum from the gum-boxes and pass under the gummers and apply the gum to the latter, substantially as described.

4. In an envelope-machine, the gummers C, consisting of the frames, arranged and secured in the head C', so as to be adjustable in the same, and adapted to move up and down on the slanting bar D to receive the gum and apply it to the blank, in combination with the slanting bar D, substantially as described.

5. In an envelope-machine, the combination of the adjustable former H, arranged and adapted to move up and down in a vertical direction and carry the blank, in connection with the bed K, and the bed K, arranged to move up under the former and descend with the latter, substantially as described.

6. In an envelope-machine for gumming and folding blanks, the combination of the gummers C, constructed to be adjustable, and the former H, arranged to strip the blank from the gummers, substantially as and for the purposes set forth.

7. In a machine for folding and gumming envelope-blanks, the combination of the adjustable gummers C, the adjustable former H, arranged to move up and down and strip the blank from the gummers and convey it, in connection with the bed K, and the bed K, arranged to move up under the former and descend with the latter, substantially as described, and for the purpose set forth.

8. In a machine for folding and gumming envelope-blanks, the combination of the adjustable former H, arranged to move up and down and convey the blank, in connection with the bed K, to the folding-rollers, the bed K, arranged to move up and down under the former and descend with the latter, and the folding-rollers arranged and adapted to turn over the side and bottom flaps of the blank, substantially as described, and for the purpose set forth.

9. In a machine for folding and gumming envelope-blanks, the combination of bed K, arranged to move up and down and provided with the slots, substantially as described, with the vertically-moving plates N, arranged to move up through the slots in the bed and be drawn down below the same, substantially as described, and for the purpose set forth.

10. In a machine for folding and gumming envelope-blanks, the combination of the adjustable former H, arranged to move up and down and strip the blank from the gummers and convey it, in connection with the bed K, to the folding-rollers, the bed K, arranged to move up under the former H and descend with the latter and provided with the slots, substantially as described, the vertically-moving plates N, the roller L, having the strip $l''$, adapted to move over the end of the former and turn and hold down the bottom flap of the blank, the rollers M, adapted to move over the sides of the former and fold the side flaps of the blank, and the grippers P, adapted to seize the envelope while on the bed K and draw it from the same, substantially as and for the purpose set forth.

11. In an envelope-machine, the combination of the gripper P, having the jaws $p$ and $p'$ and connected to the bar P', with the rod $p^5$, provided with the pin $p^7$ and the spring $p^6$ and arranged and adapted to open and close the jaws, as and for the purposes set forth.

12. In an envelope-machine, in combination, the bed K, provided with the slots, substantially as described, the rollers L M, adapted to move over the bed, and the plates N, arranged to pass through the slots and recede as the rollers move over the same, substantially as described.

13. In an envelope-machine, the combination of the former H, the plates N, adapted to raise the flaps of the blank, and the rollers M and L, adapted and arranged to turn over and press and seal the side and bottom flaps of the blanks, as and for the purposes set forth.

14. In an envelope-machine, the combination of the vertically-moving former H, the vertically-moving bed K, the frame M', and the rollers M, connected to the frame by the flexible rod $m$ and adapted and arranged to pass over the former with regular pressure and turn down and press the flap of the blank, as and for the purpose set forth.

15. In an envelope-machine, in combination, the vertically-moving former H, a support on which the blank rests, and the rollers L M, arranged to move over the former and support and turn the flaps down parallel to the body of the blank and press and seal them.

16. In an envelope-machine, the separators X', attached to the table on which the blanks rest and arranged to be adjustable and press against the edge of the pile of blanks, as and for the purposes set forth.

17. In an envelope-machine, the combination of the adjustable guides Z and separators X', as and for the purposes set forth.

18. In an envelope-machine, the combination of the vertical sliding plates N, mounted on the springs $n^2$ in the frame N' and provided with the slots O', the hooks O, adapted and arranged to enter the slots O' and draw down the plates, and the levers $N^3$, secured to the lower ends of the plates by means of the pins $n^3$ and slots $n^4$ and arranged and adapted to move down and hold the plates, substantially as described, as and for the purpose set forth.

Signed at New York, in the county of New York and State of New York, this 22d day of May, A. D. 1888.

FRANK A. JONES.

Witnesses:
GUSTAVUS W. RAWSON,
CHARLES E. JOHNSON.